(12) United States Patent
Benisty et al.

(10) Patent No.: US 7,295,744 B2
(45) Date of Patent: Nov. 13, 2007

(54) FREQUENCY-SELECTIVE LIGHT COUPLER-DECOUPLER DEVICE (75) Inventors: Henri Benisty, Palaiseau (FR); Emilie Schwoob, Sevres (FR)

(73) Assignee: Centre National de la Recherche, Paris (FR)

( * ) Notice: Subject to any disclaimer, the term of this patent is extended or adjusted under 35 U.S.C. 154(b) by 0 days.

(21) Appl. No.: 11/410,397

(22) Filed: Apr. 25, 2006

(65) Prior Publication Data

US 2007/0098345 A1    May 3, 2007

Related U.S. Application Data (63) Continuation of application No. PCT/FR2004/002726, filed on Oct. 22, 2004.

(30) Foreign Application Priority Data

Oct. 30, 2003   (FR)   ................... 03 12752

(51) Int. Cl.
G02B 6/10   (2006.01)
H04J 14/02   (2006.01)

(52) U.S. Cl. .................. 385/129; 385/131; 385/14; 385/122; 385/24; 398/79; 398/83; 398/82; 398/85

(58) Field of Classification Search .................. 385/14, 385/15, 24, 27, 28, 31, 39, 122, 129, 130, 385/131; 398/79, 81, 82, 83, 84, 85
See application file for complete search history.

(56) References Cited

U.S. PATENT DOCUMENTS

| | | | |
|---|---|---|---|
| 5,343,542 A | 8/1994 | Kash et al. | 385/31 |
| 5,559,912 A | 9/1996 | Agahi et al. | 385/42 |
| 6,093,246 A | 7/2000 | Lin et al. | 117/928 |
| 6,188,819 B1 * | 2/2001 | Kosaka et al. | 385/39 |
| 6,310,991 B1 | 10/2001 | Koops et al. | 385/14 |
| 6,618,535 B1 * | 9/2003 | Reynolds | 385/129 |
| 6,640,034 B1 * | 10/2003 | Charlton et al. | 385/122 |
| 6,738,551 B2 * | 5/2004 | Noda et al. | 385/130 |
| 6,778,746 B2 * | 8/2004 | Charlton et al. | 385/122 |

(Continued)

FOREIGN PATENT DOCUMENTS

EP    1 136 853 A1    9/2001   ............... 385/24 X (Continued)

OTHER PUBLICATIONS

Kuang et al., "Grating-assisted coupling of optical fibers and photonic crystal waveguides", *Optics Letters*, vol. 27, No. 18, Sep. 2002, pp. 1604-1606.

(Continued)

*Primary Examiner*—Brian M. Healy
(74) *Attorney, Agent, or Firm*—Alston & Bird LLP (57) ABSTRACT

A frequency-selective light coupler-decoupler device comprising a component of photonic crystal structure in which there is formed a waveguide having at least one longitudinal edge with a small number of rows of periodic elements of the photonic crystal so as to form coupling zones between the waveguide and the outside of the photonic crystal at coupling frequencies that are determined in particular by the width of the waveguide and/or by the spatial period of the photonic crystal elements.

11 Claims, 4 Drawing Sheets

U.S. PATENT DOCUMENTS

| | | | |
|---|---|---|---|
| 6,941,046 B2 * | 9/2005 | Koike et al. | 385/44 |
| 2001/0012149 A1 | 8/2001 | Lin et al. | 359/344 |
| 2002/0191905 A1 | 12/2002 | Prather et al. | 385/24 |
| 2007/0098345 A1 * | 5/2007 | Benisty et al. | 385/129 |

FOREIGN PATENT DOCUMENTS

| | | | | |
|---|---|---|---|---|
| FR | 2 841 658 A1 | 1/2004 | | 385/24 X |

OTHER PUBLICATIONS

Koshiba, "Wavelength Division Multiplexing and Demultiplexing with Photonic Crystal Waveguide Couplers", *Journal of LIghtwave Technology*, vol. 19, No. 12, Dec. 2001, pp. 1970-1975.

Tokushima et al., "Photonic crystalline defect waveguide directional coupler", *Electronics Letters*, vol. 27, No. 24, Nov. 2001.

* cited by examiner

FREQUENCY-SELECTIVE LIGHT COUPLER-DECOUPLER DEVICE

CROSS-REFERENCE TO RELATED APPLICATIONS

This application is a continuation of National Phase Application No. PCT/FR2004/002726, filed Oct. 22, 2004, which claims French Priority No. 0312752, Filed Oct. 20, 2003, which is hereby incorporated herein in its entirety by reference.

The invention relates to a frequency-selective light coupler-decoupler device of the type comprising a waveguide formed in a component of photonic crystal structure.

BACKGROUND OF THE INVENTION

Photonic crystals are periodic arrangements of dielectric elements having strong index contrast. Two-dimensional photonic crystals can be constituted by arrays of parallel columns of dielectric material or arrays of parallel cylindrical holes formed in a dielectric substrate. Waveguides can be formed in such components by missing rows of columns or holes.

It is known, in particular from the article "Mini-stopbands of one-dimensional system: the channel waveguide in a two-dimensional photonic crystal" by S. Olivier, M. Rattier, H. Benisty, C. Weisbuch et al., Physical Review B, Vol. 63, 113311 of Mar. 1, 2001, that a waveguide in a photonic crystal presents photonic band gaps or mini-stopbands (MSB) because of coupling between the fundamental mode and the higher order modes in the waveguide, the frequencies of these non-transmission bands being determined in particular by dimensional parameters of the photonic crystal (period, dimension, and shape of the elements, fill factor, . . . ), and by the width of the waveguide.

OBJECTS AND SUMMARY OF THE INVENTION

A particular object of the invention is to make use of this feature of waveguides formed in photonic crystals to make light coupler-decoupler devices that are frequency-selective.

To this end, the invention provides a frequency-selective light coupler-decoupler device comprising a component of photonic crystal structure constituted by a plurality of dielectric elements with periodic spatial distribution, and in which a waveguide having rows of said elements extending along its longitudinal edges is formed by an absence of at least one row of said elements and/or by an offset between rows of said elements on either side of the waveguide, wherein, on at least one of said longitudinal edges, the number of rows of said periodically distributed elements is reduced so as to define a thin edge of the waveguide and form coupling zones between the waveguide and the outside of the photonic crystal for coupling frequencies, each zone enabling a component at a frequency corresponding to a light signal propagating in the fundamental mode of the waveguide to be extracted from the waveguide and/or enabling a component at said frequency of a light signal to be injected into said waveguide, the coupling frequencies lying in a photonic band gap or MSB of the waveguide and being defined by variations in dimensional parameters of the waveguide and/or of the photonic crystal between the ends of the waveguide.

In a waveguide formed in a photonic crystal, since a photonic band gap or MSB results from coupling between the fundamental mode and a higher order mode of the waveguide, and since the higher order mode can penetrate quite deeply into the portion of the photonic crystal lying beside the waveguide, it is possible to extract the signal in the higher order mode from the waveguide by reducing the thickness of the portion of the photonic crystal beside the waveguide in the coupling zone, i.e. by reducing in said zone the number of rows of periodically distributed dielectric elements that define the photonic crystal.

It is thus possible to extract from the waveguide a frequency component of the signal propagating in its fundamental mode, the frequency of the extracted component lying in a photonic band gap or MSB of the waveguide.

In the zone where said frequency component is extracted, the number of rows of said dielectric elements forming the thin edge of the photonic crystal typically lies in the range 2 to 6, at least.

The invention makes it possible to provide a frequency-selective light coupler-decoupler device having a plurality of channels, enabling signals to be coupled or decoupled at different frequencies.

For this purpose, the width of the waveguide may vary, either continuously or in steps, between the ends of the waveguide.

In a variant, the spatial period of the dielectric elements of the photonic crystal may vary, either continuously or in steps, between the ends of the waveguide.

In other variants, it is the shape or the size of the elements of the photonic crystal that are caused to vary between the ends of the waveguide, in order to vary the coupling frequencies and the strength of coupling.

The length of each coupling zone in the waveguide for extracting or injecting a frequency component typically corresponds to a few tens of spatial periods of said dielectric elements.

According to another characteristic of the invention, the rows of dielectric elements forming a coupling zone on a thin edge of the waveguide are deformed so as to constitute a lens that is converging or diverging towards the outside of the waveguide.

This makes it possible in particular to cause the light signal corresponding to the frequency component extracted from the waveguide to converge on a sensor, or conversely to cause a light signal corresponding to a frequency component being injected into the waveguide through the coupling zone to converge on the inside of the waveguide.

According to yet another characteristic of the invention, at least one detector, e.g. an integrated photodiode, is placed along a coupling zone outside the waveguide in order to pick up the frequency component extracted from the light signal propagating in the fundamental mode of the waveguide.

It is thus easy to monitor the frequency content (in the photonic band gaps) of a signal propagating in the fundamental mode of the waveguide.

By placing a plurality of photodetectors along coupling zones outside the waveguide of the device of the invention, it is possible to pick up the various frequency components lying within the photonic band gaps or MSBs of a light signal injected into the waveguide in fundamental mode.

By associating the device with the rear face of a laser diode, it is thus possible to detect and monitor the frequency of the laser beam emitted by the diode.

This also makes it possible to monitor and control the frequency of the laser beam emitted by a tunable laser diode.

The device of the invention can also be used to couple frequency components into the waveguide of the photonic crystal, thus making it possible to constitute a device for multiplexing said frequency components.

A device of the invention used for multiplexing can serve to heterodyne two light signals of similar frequencies, one of which carries information that is modulated in amplitude, in frequency, or in phase. Within the waveguide, the signals are then mixed in linear manner. By means of a photodiode placed at the end of the waveguide, it is possible to detect an electrical signal at the difference between the frequencies of the signals, thus enabling the information carried by one of the signals to be detected.

BRIEF DESCRIPTION OF THE DRAWINGS

The invention can be better understood and other characteristics, details, and advantages thereof appear more clearly on reading the following description given by way of example and made with reference to the accompanying drawings, in which.

MORE DETAILED DESCRIPTION

Figure 1:
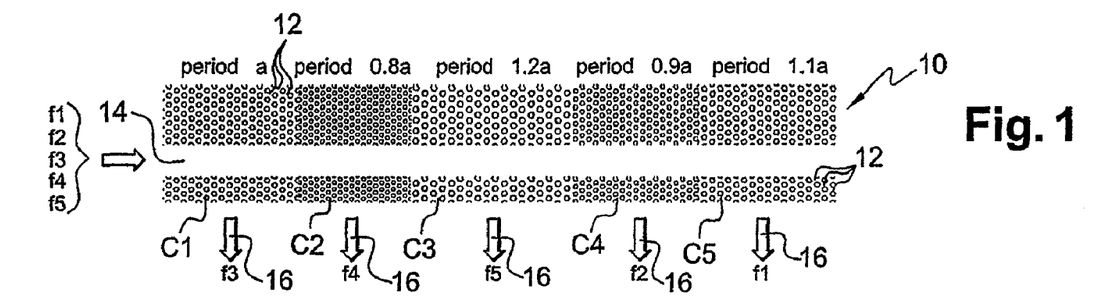
FIGS. 1, 2, and 3 are diagrams showing various embodiments of a coupler-decoupler device of the invention.
Figure 2:
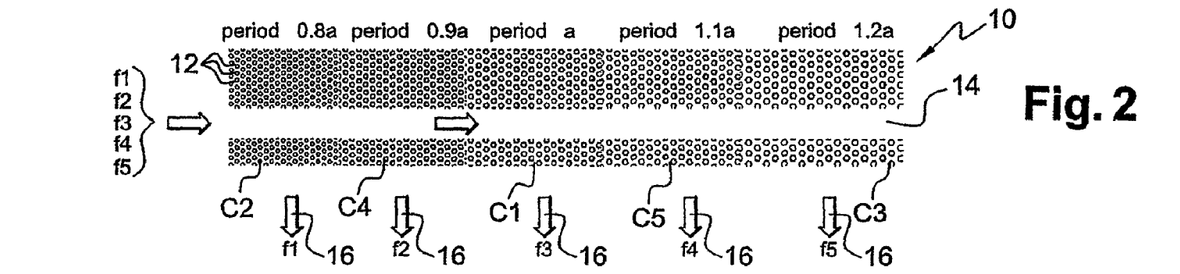
Figure 3:
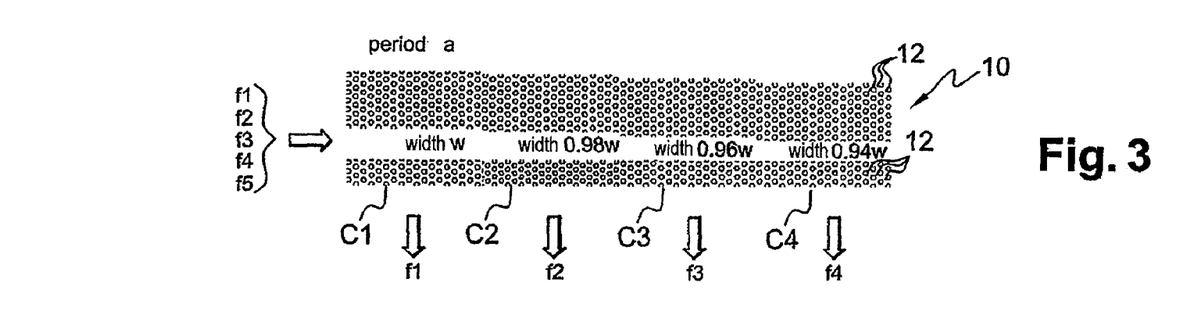

Reference is made initially to FIGS. 1, 2, and 3 which are diagrams of three embodiments of a device of the invention.

The device essentially comprises a photonic crystal structure component 10 which is constituted by an array of dielectric elements at a periodic distribution, such as for example rows of cylindrical holes 12 formed in a dielectric or semiconductor substrate having a refractive index that is close to 3, for example.

The photonic crystal made in this way is in the form of an elongate rectangle, having a length that can be of the order of several hundred times the spatial period $a$ of the dielectric elements 12 and a width that may lie in the range about 10 times to a few tens of times the spatial period $a$. A multimode longitudinal waveguide 14 is formed in the component 10 by the absence of at least one row of dielectric elements 12, with the number of missing rows typically lying in the range 2 to 6.

A waveguide may be created in a photonic crystal in other ways, e.g. by separating two parts of a photonic crystal and moving the two parts by shifting them along the axis of the waveguide and/or in the perpendicular direction in the plane of the crystal, the offset on the axis of the waveguide having an arbitrary value lying in the range 0 to one half-period.

More generally, the waveguide can thus be formed by an absence of periodic elements between two portions of a photonic crystal.

When the waveguide 14 is made of one or more missing rows of periodic elements 12 in the photonic crystal, a plurality of modes can coexist within the waveguide, and the strong periodicity of the edges of the waveguide at the scale of the wavelength of the propagated signal leads to these modes being coupled together, i.e. the modes are diffracted reciprocally into one another. Mode coupling takes place at a precise frequency that is determined as a function of parameters that are characteristic of the photonic crystal and of the waveguide and it requires a certain number of spatial periods in order to produce its effects in full, where said number may be a few tens of periods and depends on the strength of the coupling and on the fraction of the light to be coupled (or decoupled).

When the two coupled modes are of very different kinds, the higher order mode can penetrate quite deeply into the portion of the photonic crystal beside the coupling zone in the waveguide 14. By reducing the width of the photonic crystal in this zone, i.e. by reducing the number of rows of elements 12 beside the photonic crystal in this zone, it is possible to encourage extraction of the high order mode from the waveguide, with said mode tending to direct its energy flux in a direction that is substantially perpendicular to the waveguide.

In the devices of the invention that are shown in FIGS. 1 to 3, the waveguide 14 is defined on one side by a relatively high number of rows of dielectric elements 12, preventing high order modes being extracted from the coupling zones, and by a small number of rows of elements 12 on the other side, enabling high order modes to be extracted through these rows from the coupling zones, as represented by arrows 16.

This small number of rows is a compromise between the need to maintain a well-defined high order mode, thus requiring a certain width for the edge of the waveguide, and the losses encountered by the light in this mode on passing through said edge of the waveguide.

The device of the invention shown in FIG. 1 has five coupling zones C1-C5 that are substantially of the same length and that differ from one another by the periods of the dielectric elements 12 of the photonic crystal. In the zone C1, this period is equal to $a$, in the zone C2 it is equal to 0.8a, in the zone C3 it is equal to 1.2a, in the zone C4 it is equal to 0.9a, and in the zone C5 it is equal to 1.1a. These coupling zones correspond to coupling frequencies f1-f5. These frequencies vary inversely with the period of the dielectric elements 12, so the zone C3 having the longest period thus has the lowest coupling frequency f5, while the coupling zone C2 having the shortest period of 0.8a has the highest coupling frequency f1.

When light signals having components at the frequencies f1-f5 are injected into the end of the guide 14 in fundamental mode, the frequency components of these signals are extracted by the coupling zones C1 to C5 in the frequency order f3, f1, f5, f2, and f4.

In the embodiment shown diagrammatically in FIG. 2, the component 10 has the same coupling zones C1 to C5, but they are formed between the longitudinal ends of the waveguide in order of increasing spatial period for the distribution of the dielectric elements 2, i.e. in the order C2-C4-C1-C5-C3 between the inlet and the outlet of the waveguide 14.

When light signals having components at the frequencies f1 to f5 are injected into the input of the waveguide 14 in fundamental mode, the frequency components extracted from the waveguide between the inlet and the outlet are in the order f1, f2, f3, f4, and f5.

In the embodiment of FIG. 3, the component 10 has four coupling zones C1, C2, C3, and C4 of the same length and having the dielectric elements 12 of the photonic crystal distributed with et same period a, these coupling zones differing by the width of the waveguide 14 which decreases from the coupling zone C1 at the inlet to the waveguide to the coupling zone C4 at the outlet from the waveguide. As shown, the waveguide 14 has a width w in the coupling zone C1, a width equal to 0.98 w in the coupling zone C2, a width equal to 0.96 w in the coupling zone C3, and a width equal to 0.94 w in the coupling zone C4. These small variations in width provide very good transmission with practically no reflection of light signals from one coupling zone to the next.

These coupling zones correspond to coupling frequencies f1, f2, f3, and f4 that increase from f1 to f4.

When light signals having components at the frequencies f1 to f4 are injected into the inlet of the waveguide 14 in fundamental mode, the component of frequency f1 is extracted from the waveguide in the coupling zone C1, the component of frequency f2 is extracted from the waveguide in the coupling zone C2, the component of frequency f3 is extracted from the coupling zone C3, and the component of frequency f4 is extracted from the coupling zone C4.

Naturally, it is possible to vary the period of the spatial distribution of the dielectric elements 12 of the photonic crystal while also simultaneously varying the width of the waveguide 14.

The spatial period and the width can be made to vary in steps as shown in FIGS. 1 to 3, or continuously.

When the device of the invention is used for decoupling as shown in FIGS. 1 to 3, it may be advantageous for the portion of the photonic crystal 10 that forms the thin edge of the waveguide 14 to include a lens in the coupling zone C, the lens converging or diverging towards the outside of the waveguide depending on whether the device is used for decoupling or coupling light.

Figure 4:
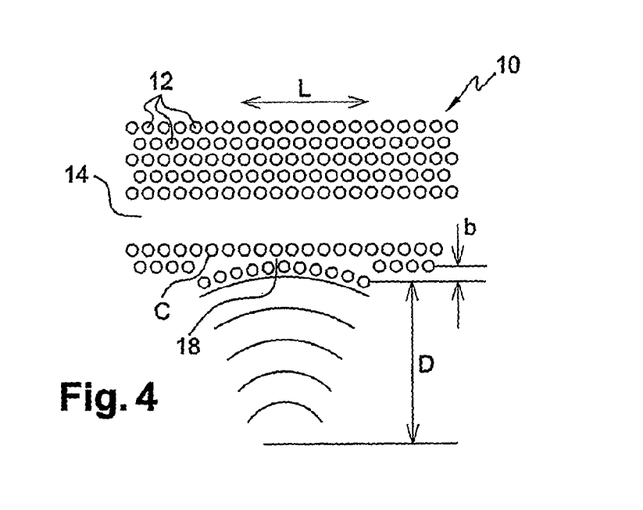
FIG. 4 is a diagram showing a device of the invention formed with a converging lens.

In FIG. 4, the waveguide 14 formed in the photonic crystal 10 is defined along its thin edge by two rows of dielectric elements 12, with at least one of the rows being deformed to constitute a lens 18 that acts as a converging lens towards the outside of the waveguide 14. In the example shown, the outer row of dielectric elements 12 comes closer to the inner row of said elements in the middle of the coupling zone C by a transverse distance b so as to constitute a converging lens of focal length D equal to $L^2/8$ df, where L is the length of the deformed zone of the outer row of dielectric elements 12, b is the transverse deformation of said row, and f is the fill factor of the photonic crystal. This produces a focal length of 100 micrometers (μm) for a length L equal to 22 μm, with deformation b being equal to 0.5 μm, and with a fill factor equal to 0.3.

Figure 5:
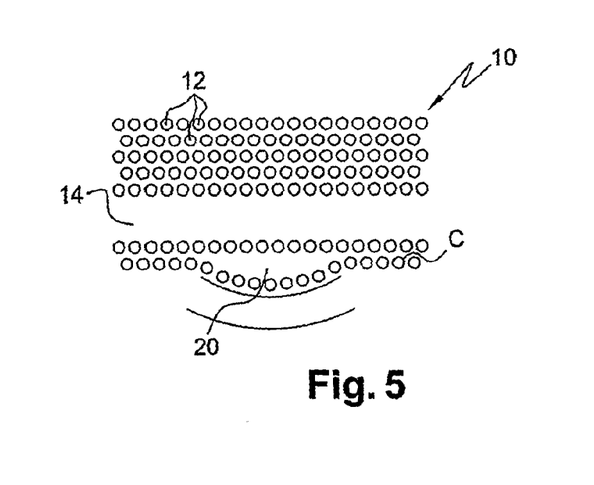
FIG. 5 is a diagram of a device of the invention formed with a diverging lens.

As shown in FIG. 5, a lens 20 that diverges towards the outside of the waveguide is formed by deforming in the opposite direction the outer row(s) of elements 12 forming the thin edge of the waveguide 14 in the coupling zone, said diverging lens serving to converge towards the inside of the waveguide a frequency component that is injected from the outside into the coupling zone corresponding to the lens 20.

Figure 6:
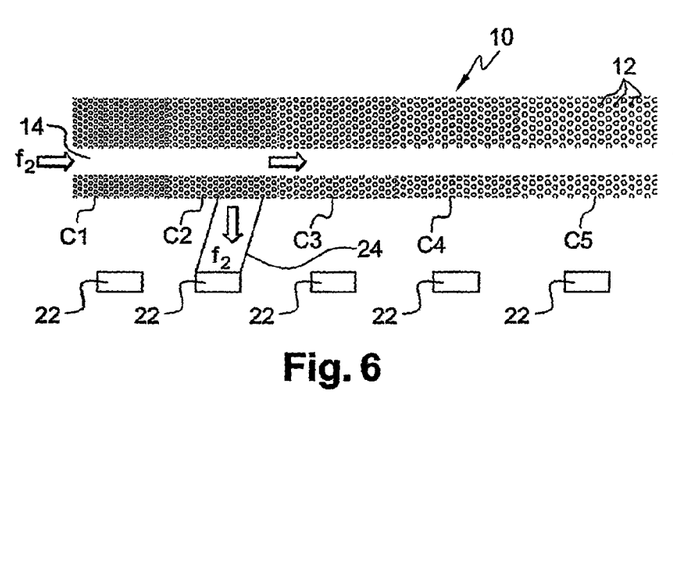
FIGS. 6 and 7 are diagrams of devices of the invention for detecting frequency components in a light signal.

FIG. 6 is a diagram of a device of the invention having a series of detectors 22 such as integrated photodiodes that are arranged along the thin edge of the component 10, each detector 22 being placed in register with a respective coupling zone C1, C2, C3, C4, or C5, and the rows of elements 12 of the thin edge being shaped to deliver a collimated light beam to each photodetector 22, said beam comprising a coupling frequency component between fundamental mode and a high order mode in the corresponding zone of the waveguide 14.

Figure 7:
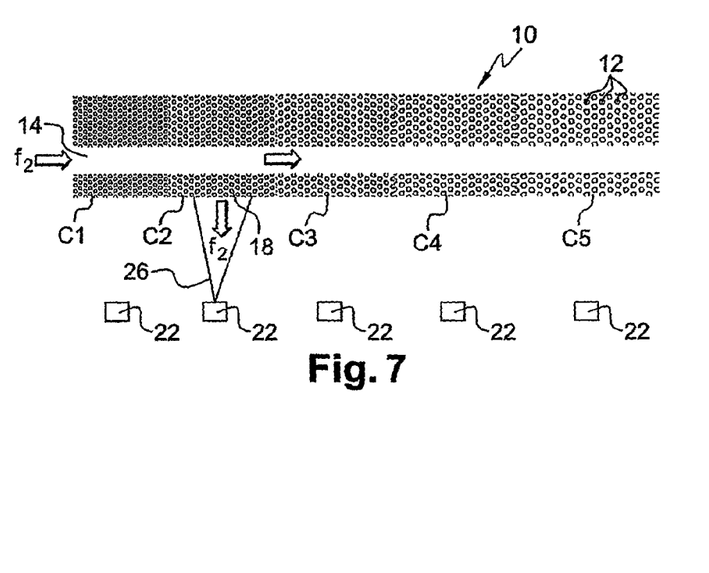

FIG. 7 shows a similar disposition, but in which the rows of dielectric elements 12 defining the thin longitudinal edge of the waveguide 14 situated facing the photodetectors 22 has converging lenses 18 for focusing the frequency components 26 extracted from the waveguide in the coupling zones C1-C5 onto the photodetectors.

Figure 8:
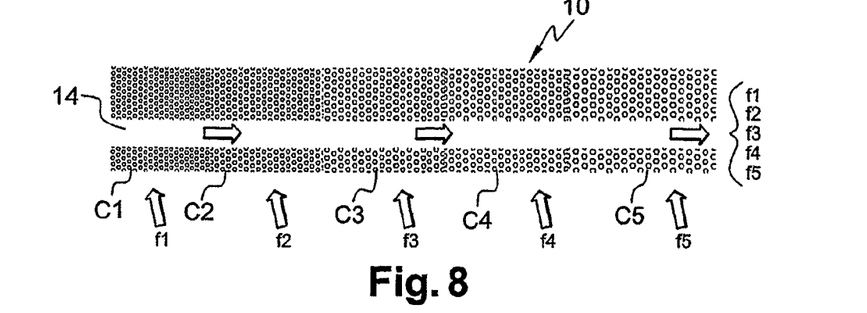
FIG. 8 is a diagram of a device of the invention used as a multiplexer.

FIG. 8 shows a device of the invention used for frequency-selective light coupling, for multiplexing different frequency components into the waveguide.

In the example shown, the device has five coupling zones C1, C2, C3, C4, and C5 of coupling frequencies f1, f2, f3, f4, and f5 respectively.

When light signals 30 having components at these coupling frequencies are directed onto the thin edge of the component 10, the component of frequency f1 of the signals 30 is injected into the waveguide in the coupling zone C1, the component of frequency f2 of the signals 30 is injected into the waveguide in the coupling zone C2, and so on, so that downstream from the coupling zone C5 the waveguide 14 contains a linear mixture of the components of the light signals 30 at the frequencies f1, f2, f3, f4, and f5.

It is thus possible to couple a plurality of light signals having respective frequencies corresponding to the coupling frequencies of the various coupling zones of the component 10 with the fundamental mode of the waveguide 14 when each of said light signals is directed onto an appropriate portion of the thin edge of the waveguide.

In order to facilitate coupling with the fundamental mode of the waveguide 14, these thin edge portions of the waveguide may have diverging lenses 20 as shown in FIG. 5.

Figure 9:
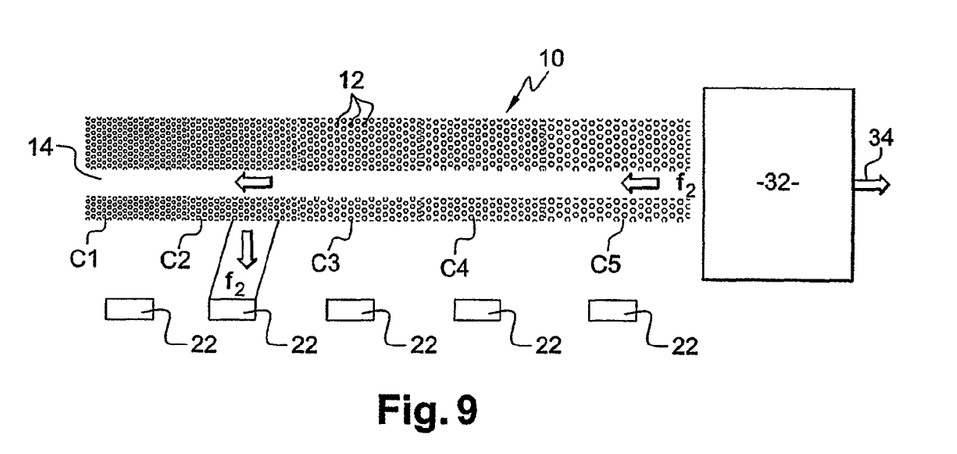
FIG. 9 is a diagram of a device of the invention associated with a laser diode for detecting the frequency of the emitted laser beam.

FIG. 9 shows an application of a device of the invention to monitoring the frequency of a beam emitted by a laser diode 32 having the component 10 of the device of the invention placed on the back thereof, this component comprising, for example, five coupling zones C1 to C5 for frequencies f1 to f5. If the laser beam emitted by the diode 32 is at a frequency f2, a light signal of frequency f2 can be injected into the waveguide 14 in fundamental mode from behind the laser diode 32 as shown.

This signal of frequency f2 is coupled to a high order mode in the coupling zone C2 of coupling frequency f2 equal to the frequency of the laser beam or very close to said frequency, such that the signal in the high order mode can pass through the thin edge of the waveguide in the coupling zone C2 and can be picked up by a photodetector 22 associated with said coupling zone.

Figure 10:
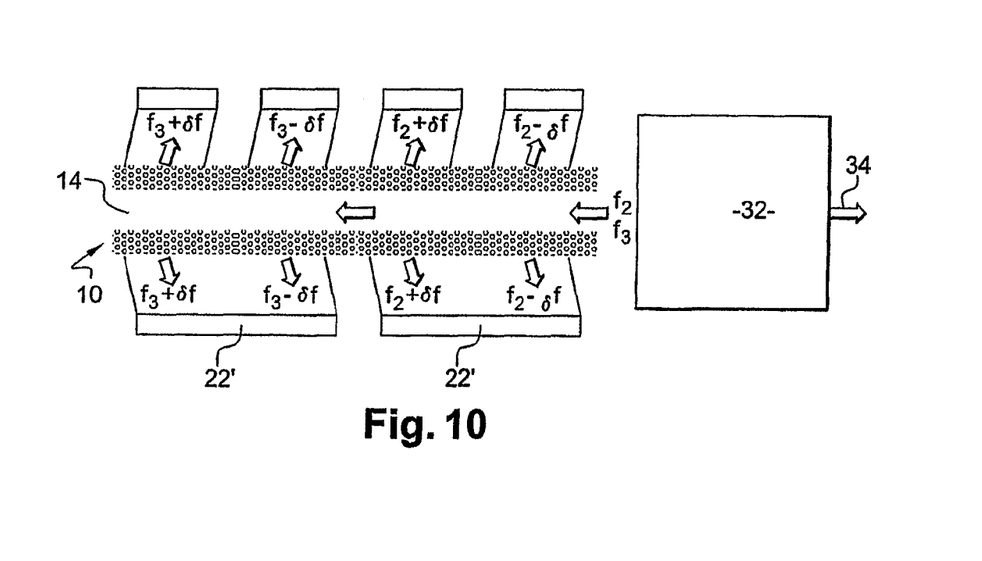
FIG. 10 is a diagram of a device of the invention associated with a tunable laser diode for detecting and controlling the frequency of the emitted laser beam.

As shown diagrammatically in FIG. 10, it is also possible to use a device of the invention for monitoring and controlling the emission frequency of a tunable laser diode 32.

In this example, the device placed behind the laser diode 32 comprises a component 10 of the above-specified type formed using a waveguide 14 between two thin edges, i.e. having edges made up of a small number of rows of periodic elements 12.

By way of example, the device has four coupling zones C1, C2, C3, and C4 corresponding to coupling frequencies f2−δf, f2+δf, f3−δf, and f3+δf, respectively.

Photodetectors 22, 22' such as integrated photodiodes are arranged on either side of the component 10 along the waveguide 14, each photodiode 22 being associated with a coupling zone C1 to C4, and each photodiode 22' being associated with a pair of coupling zones C1 & C2 or C3 & C4, respectively.

The signals output by the photodiodes 22' can be used for coarse monitoring of the frequency f2 or f3 emitted by the laser diode 32, with the laser diode being tuned by seeking a maximum in the output signal from one of the photodiodes 22', while the output signals from the photodiodes 22 are used for fine monitoring based on differential measurements between the photodiodes 22 receiving the signals of frequency f2−δf and f2+δf, or between the photodiodes 22 receiving the signals of frequency f3−δf and f3+δf.

Figure 11:
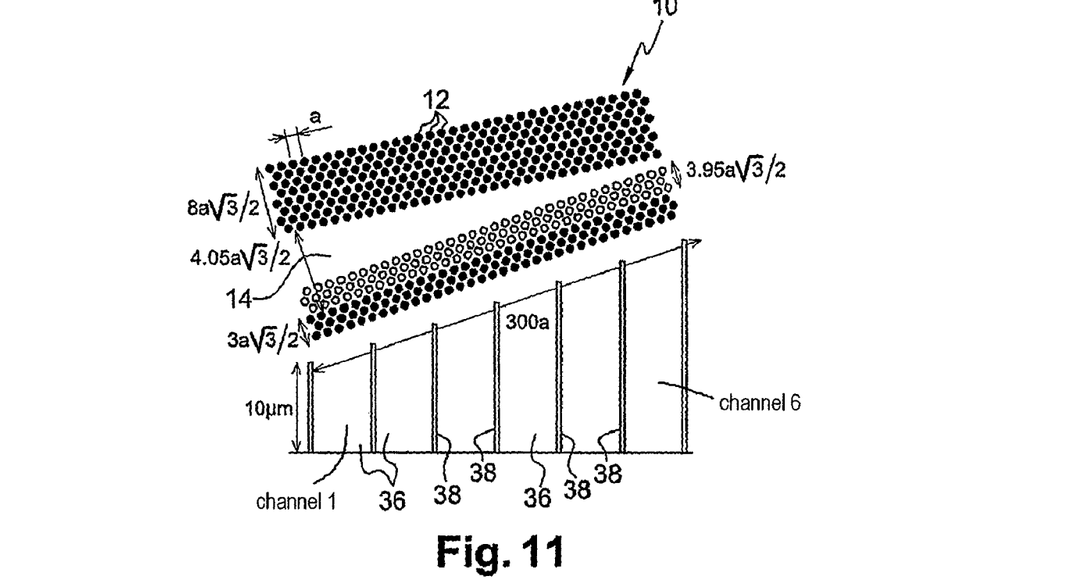
FIG. 11 is a diagram showing an embodiment of a device of the invention.

An embodiment of a device of the invention is described below in detail with reference to FIG. 11.

In this embodiment, the component 10 is a light-guiding vertical heterostructure comprising a core layer of GaInAsP having a refractive index n=3.33 and having thickness e=450 nanometers (nm), which core is surrounded by two confining layers of InP having lower index n=3.17. Triangular arrays of photonic crystals are etched through the heterostructure, with the mean depth of the holes being about 2 μm. The fill factor in air of these structures is 40%. The period $a$ of the triangular array of holes 22 is equal to 380 nm. The waveguide 14 is formed in this component by omitting three rows of holes and it presents a width between its edges corresponding to the width of four rows of holes 22, with this width varying continuously from one end of the waveguide 14 to the other between the values given in FIG. 11, i.e. from 4.05a √3/2 to 3.95a √3/2.

One of the longitudinal edges of the waveguide has eight rows of holes 22 and thus has a width equal to 8a √3/2, and the other longitudinal edge of the waveguide 14 has three rows of holes, thus having a width equal to 3a √3/2.

Six outlet channels 36 are defined in the component by air trenches 38 acting as reflectors and enabling the light signals to be isolated from one another, forming between them broad waveguides.

The length of the waveguide 14 is equal to 300 times the period $a$ and the length of the outlet channels 36 is 10 μm.

Figure 12:
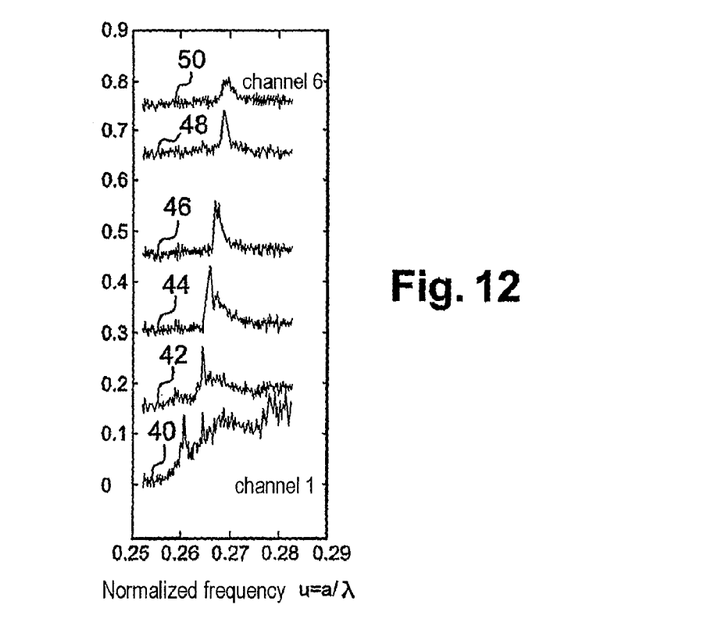
FIG. 12 is a diagram plotting curves of the frequency components extracted from the waveguide by the various outlet channels of the FIG. 11 device.

Curves plotting the intensity of the light signals picked up in the outlet channels 36 are shown diagrammatically in FIG. 12.

These intensity curves correspond to incident light at the inlet to the waveguide 14 having a center wavelength of 1.55 μm with a spectral width of 150 nm. In this example, the light is produced by optically pumping an active layer included in the vertical heterostructure. This light couples with the fundamental mode of the waveguide 14, and on passing through the first coupling zone corresponding to the first outlet channel 36, a spectral fraction of the light around 1610 nm is coupled to the mode of order 5 and passes into the first outlet channel 36.

The corresponding spectrum is shown at 40 in FIG. 12, and it can be seen that the signal picked up in the first outlet channel 36 includes interference from the incident light for high normalized frequencies.

In the second outlet channel 36, light is picked up that is the result of the fundamental mode coupling with the mode of order 5 in a portion of the waveguide 14 that is narrower, so the coupling frequency is therefore higher than at the beginning of the waveguide. The signal picked up in the second outlet channel 36 is shown at 42 in FIG. 12.

The other spectra 44, 46, 48, and 50 shown in FIG. 12 correspond to the signals picked up in the other outlet channels, going from channel 3 to channel 6.

It can be seen from the spectra shown in FIG. 12, it can be seen that for total variation in the width of the waveguide equal to 0.1a √3/2, there is a wavelength shift of 50 nm, which is given by the difference between the wavelengths of the signals picked up in channel 1 and in channel 6. This measurement does indeed correspond to the expected theoretical value.

The dimensional characteristics of devices of the invention can be determined in practice in the manner described below. Firstly, it is possible to model frequency bands of a section without variation of the photonic crystal waveguide, in a version without a thin side. This can be done by planewave development or by any other known method, for example fineness—difference—time—domain (FDTD) simulation. The permitted bands in the waveguides and the modes associated therewith are described in publications known to the person skilled in the art.

Thereafter, the force of interaction between the fundamental mode and the high mode is quantified using the mini-stopband Δω between the two modes in application of the formula:

$$K=4c/\Delta\omega(nga+ngb)$$

where K is the coupling constant, $c$ is the speed of light, and nga and ngb are the group refractive indices of mode $a$ and of mode $b$.

The degree of transfer Tc from a wave of one mode to the other for a uniform section of length L is given by:

$$Tc=1-1/\cosh^2(KL)\approx 1-\exp(-2KL)$$

for large L, where cosh is the hyperbolic cosine. This makes it possible to select L as a function of the desired transfer rate.

As mentioned above, in order to vary the coupling frequency in the waveguide, it is possible to vary the width of the waveguide and/or the spatial period of the periodic elements 12, and it is also possible to vary the shape and/or the size of these elements, e.g. by varying the shape of the holes formed in the component (circular, elliptical, triangular, . . . shapes) and by varying their sizes. Such modification could apply to only one of the rows beside the waveguide and need not necessarily apply to the row immediately adjacent thereto.

What is claimed is:

1. A frequency-selective light coupler-decoupler device comprising a component of photonic crystal structure constituted by a plurality of dielectric elements with periodic spatial distribution, and in which a waveguide having rows of said dielectric elements extending along its longitudinal edges is formed by an absence of at least one row of said dielectric elements and/or by an offset between rows of said dielectric elements on either side of the waveguide, wherein, on at least one of said longitudinal edges, the number of rows of said dielectric elements is reduced so as to define a thin edge of the waveguide and form coupling zones between the waveguide and the outside of the photonic crystal structure for coupling frequencies, each zone enabling a component at a frequency corresponding to a light signal propagating in the fundamental mode of the waveguide to be extracted from the waveguide through its thin edge and/or enabling a component at said frequency of a light signal to be injected into said waveguide through its thin edge, the coupling frequencies lying in a photonic band gap or MSB of the waveguide and being defined by variations in dimensional parameters of the waveguide and/or of the photonic crystal structure between the ends of the waveguide.

2. The device according to claim 1, wherein the number of rows of said dielectric elements of the thin edge of the waveguide lies in the range 2 to 6.

3. The device according to claim 1, wherein the width of the waveguide varies continuously or in steps between its ends.

4. A device according to claim 1, wherein the spatial period of the dielectric elements of the photonic crystal structure varies continuously or in steps between the ends of the waveguide.

5. The device according to claim 3, wherein the width of the waveguide or the spatial period of the dielectric elements of the photonic crystal structure is constant over a length of the waveguide corresponding to a few tens of periods of said dielectric elements of the photonic crystal structure.

6. The device according to claim 1, wherein the size and/or the shape of said dielectric elements varies/vary between the ends of the waveguide.

7. The device according to claim 1, wherein lenses that converge or diverge towards the outside of the waveguide are formed along the waveguide by deforming the rows of dielectric elements of the thin edge of the waveguide in the coupling zones.

8. The device according to claim 1, wherein at least one detector is placed in a coupling zone outside the thin edge of the waveguide in order to pick up a frequency component extracted from a light signal propagating in the fundamental mode of the waveguide.

9. The device according to claim 8, wherein a plurality of detectors are arranged along the thin edge(s) of the waveguide in order to pick up the frequency components of the light signal propagating in the fundamental mode of the waveguide.

10. The device according to claim 8, the device being associated with a laser diode, in particular of the tunable type for detecting or monitoring the frequency emitted by the laser diode.

11. The device according to claim 1, constituting means for multiplexing light signals injected into the waveguide through a thin edge of the photonic crystal structure.

* * * * *